Sept. 4, 1951 H. NORÉN 2,566,462

CONTROL MECHANISM FOR PHONOGRAPHS

Filed May 29, 1946 2 Sheets-Sheet 1

Inventor
Helge Noren
By Young, Emery & Thompson
Attys.

Inventor
Helge Norén
By
Young, Emery & Thompson
Attys.

Patented Sept. 4, 1951

2,566,462

UNITED STATES PATENT OFFICE 2,566,462

CONTROL MECHANISM FOR PHONOGRAPHS

Helge Norén, Edsviken, near Stockholm, Sweden, assignor to Industriaktiebolaget Luxor, Motala, Sweden, a corporation of Sweden Application May 29, 1946, Serial No. 672,972
In Sweden May 28, 1945

Section 1, Public Law 690, August 8, 1946
Patent expires May 28, 1965

5 Claims. (Cl. 274—10)

Phonographs are often provided with a control mechanism which automatically commences to operate when a record has been played and which, according to the nature of the phonograph, may stop the phonograph, or cause a new record to be placed in the playing position, or bring about some other desired operation. Many of these control mechanisms are based upon the feature that the angular velocity of the tone arm is increased when the playing of a record is concluded and the reproducing needle enters an end groove which is steeper than the sound groove proper.

The control mechanisms of this type hitherto known are marred by the drawback that they do not operate for records which are lacking the aforesaid steep end groove.

An object of the present invention is to eliminate this drawback and to provide a control mechanism which operates regardless of whether the records being played are provided with such steep end groove or not.

According to this invention the control mechanism comprises an impulse receiving member coupled to the tone arm, and a cam member adapted to be driven from the turntable and provided with a number of cams for actuating said impulse receiving member, the cams and the impulse receiving member being arranged to cooperate in such a manner that during the playing of a record the impulse receiving member is moved by the tone arm into the path of movement of a first of said cams, thereupon is moved back into the path of movement of a second of said cams but is again moved in the first-mentioned direction clear of said second cam as long as the reproducing needle runs in the sound groove proper of the record, whereas when said needle enters a steep end groove and also when it enters a circular concentric end groove an impulse, which may be utilized as a control impulse, is imparted to the impulse receiving member by said cam member, such impulse being imparted thereto in the first-mentioned case by the first cam as a result of the impulse receiving member being moved a greater distance into the path of movement of said first cam, and in the last-mentioned case by said second cam as a result of the ceasing of the movement of the tone arm and thus of the impulse receiving member and the remaining of the latter in the path of movement of said second cam.

The invention is more particularly described with reference to the accompanying drawings showing two constructions by way of example. In these examples it is assumed that the mechanism controls the record changing device of a magazine phonograph.

Figure 2:
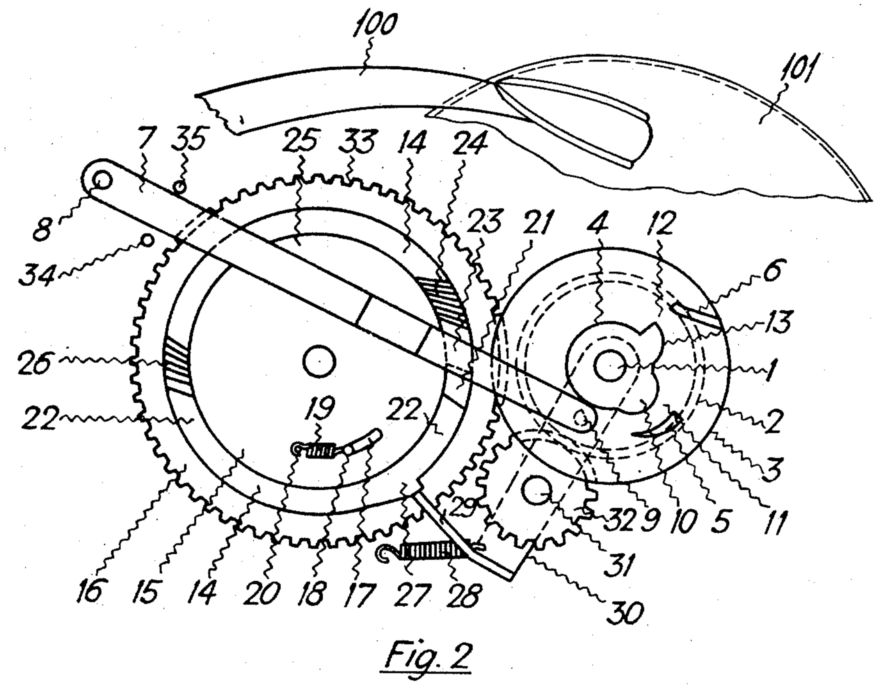
Fig. 2 is a plan view of the same.
Figure 1:
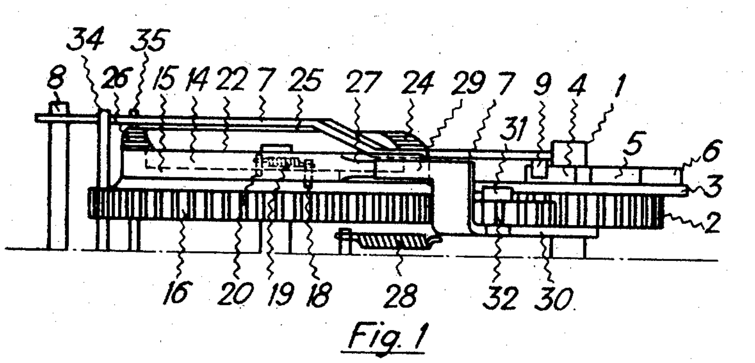
Fig. 1 is a side elevation of the first embodiment of the control mechanism according to the invention.

In Figs. 1 and 2 reference numeral 1 designates a shaft which is continuously rotated clockwise by the motor of the phonograph. Shaft 1 may be the turntable shaft, but preferably it should be rotated at a speed which is ⅓ to ¼ of that of the turntable shaft. The shaft 1 carries a gear 2 formed with a disc 3 at its upper side upon which three cams 4, 5 and 6 are provided. An arm 7 is pivotally mounted on a shaft 8. This arm 7 is frictionally coupled to the tone arm in such a manner that when the tone arm is slowly swung clockwise during the playing of a record the arm 7 is turned counter-clockwise about the shaft 8. A pin 9 secured to the free end of the arm 7 is thereby moved into the path of movement of a projection 10 of the central cam 4. The projection 10 moves the pin 9 back, i. e. it turns the arm 7 clockwise about the shaft 8 utilizing the frictional coupling between the arm 7 and the tone arm 100. The pin 9 is thus caused to pass through a channel-shaped space 11 formed between the projection 10 and the outer cam 5. When the disc 3 has been rotated through a quarter of a complete revolution starting from the point where the projection 10 was in contact with the pin 9, the pin 9 has to pass through a gate 12 formed between another projection 13 of the central cam 4 and the cam 6. The gate 12 serves to move the pin 9 to a predetermined starting position and in view of certain occurrences at the playing of records having a circular end groove and being badly centered it is advantageous to make such provisions that the turntable performs a number of revolutions during the period after the gate 12 leaves the pin 9 and until the projection 10 again engages said pin.

The arm 7 resiliently rests on a circular cam 14 provided near the periphery of a wheel 15 which is supported by another wheel 16 and is restrictedly rotatable with respect to the latter by means of a slot 17 made in the wheel 15 and a pin 18 secured to the wheel 16 and extending through said slot. A coiled tension spring 19 extending between the pin 18 and a pin 20 secured to the wheel 15 tends to rotate the wheel 15 counter-clockwise with respect to the wheel 16.

Figure 3:
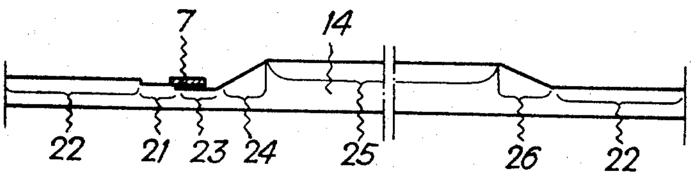
Fig. 3 is an evolution of a circular cam used in the mechanism according to Figs. 1 and 2.

The evolution of the circular cam 14 is shown in Fig. 3. The arm 7 normally rests on a portion 21 of the same which at the left hand end borders upon a somewhat higher located cam portion 22 and at the right hand end borders upon a somewhat lower located cam portion 23. To the right the cam portion 23 is followed by an inclined cam portion 24 which leads to an elevated cam portion 25. Following the elevated cam portion 25 there is a sloping cam portion 26 leading to the afore-mentioned cam portion 22 which is shown in part at the right hand end and in part at the left hand end of Fig. 3.

The circular cam 14 has a radial projection 27 (Fig. 2) against which bears a finger 29 belonging to an arm 30 which is pivotally mounted on the shaft 1 and actuated by a coiled spring 28. The arm 30 carries a pin 31 upon which is pivotally mounted a gear 32 which is permanently in mesh with the gear 2. The spring 28 tends to turn the arm 30 so as to move the gear 32 into mesh also with the toothed rim 33 of the wheel 16 but is prevented from doing this as long as the finger 29 bears against the projection 27 of the circular cam 14.

Two stop pins 34 and 35 serve to limit the turning movement of the arm 7.

The operation of the device above described is as follows.

During the playing of a record the various parts occupy the positions shown in the figures. As a result of the slow turning movement of the tone arm 100 the pin 9, as previously described, is slowly moved inwardly towards the centre of the wheel 3. Once during each revolution of the wheel 3 the projection 10 of the cam 4 moves the pin 9 back to the position into which it was previously guided by the gate 12. As long as the needle of the tone arm runs in the sound groove proper of the record, the arm 7 thus performs an oscillating movement about its pin 8. The amplitude of this movement is so small that the arm 7 remains upon the cam portion 21, i. e. the inward movement of the pin 9 towards the centre of the wheel 3 before the pin is returned outwardly by the projection 10 is not great enough to cause the arm 7 to leave the cam portion and to fall down to the lower cam portion 23 of the circular cam 14 (see Fig. 3). However, if the angular velocity of the tone arm is increased which will be the case when the playing of the record is concluded and the needle enters a steep end groove the inward movement of the pin 9 towards the shaft 1 before the same is returned outwardly will be so great that the arm 7 falls down from the cam portion 21 on to the lower cam portion 23.

When the pin 9 is next returned outwardly by the projection 10 on the central cam 4 the arm 7 will exert a pressure on the shoulder between the cam portions 21 and 23 and rotate the wheel 15 clockwise with respect to the wheel 16 against the action of the spring 19. This causes the radial projection 27 on the circular cam 14 to leave the finger 29 so that the arm 30 is free to move inwardly under the action of the spring 28. As a result of the turning of the arm 30 the gear 32 is brought into mesh with the toothed rim 33 of the wheel 16 which latter thus starts to rotate clockwise. This rotation is transmitted also to the wheel 15 by means of the pin 18 which engages the left hand end of the slot 17.

At the rotation of the wheel 15 the inclined portion 24 of the circular cam 14 first raises the arm 7 so that the pin 9 is moved clear of the cams 4, 5 and 6 on the cam member 3 and the latter may rotate freely without interfering with the pin 9. During this period the record changing mechanism of the phonograph is caused to operate whereby a new record is placed in the playing position on the turntable and the needle of the tone arm is moved into the starting groove of the same. The means for transmitting the necessary control movements to the record changing mechanism may suitably be actuated by cams which may be provided on the edge of the wheel 16.

When the record changing operation is concluded the sloping cam portion 26 of the circular cam 14 enters under the arm 7 so that the latter is lowered onto the cam portion 22 and, upon further rotation of the wheel 15, on to the cam portion 21. The gear ratio of the wheels 3 and 16 is such that when the sloping cam portion 26 lowers the pin 9 into its operative position the cam 5 has just passed but the cam 6 has not yet passed the point where the pin 9 is lowered. After having re-assumed its operative position the pin 9 is therefore immediately guided to the predetermined starting position by the gate 12 irrespective of the position of the arm 7.

When the wheel 16 has made almost a complete revolution the radial projection 27 of the circular cam 14 again enters under the finger 29 of the arm 30 swinging the latter counter-clockwise against the action of the spring 28 whereby the gear 32 is brought out of mesh with the toothed rim 33 of the wheel 16 and the rotation of the latter ceases. The various parts have now re-assumed the positions shown in the figures.

If the record being played is lacking a steep end groove and instead is provided with a circular concentric end groove the pin 9, after the reproducing needle has entered this end groove, will remain in the position to which it was last moved by the gate 12 since the turning movement of the tone arm now ceases. With the pin 9 in this position the foremost tip of the cam 5 upon continued rotation of the wheel 3 will engage the inner bevelled surface of the pin 9 so that the pin 9 is moved outwardly and caused to slide along the outer curved side of the cam 5. This outward movement of the pin 9 and hence of the arm 7 carrying the same is of such magnitude that the left hand edge of the arm 7 will exert a pressure on the shoulder between the cam portions 21 and 22 of the circular cam 14 and rotate the wheel 15 clockwise with respect to the wheel 16, as previously described, whereby the radial projection 27 on the circular cam 14 leaves the finger 29 of the arm 30 and the latter is free to move inwardly under the action of the spring 28. The wheels 2 and 16 are thus drivingly connected by means of the intermediate wheel 32 and a record changing operation is started just as described for records having a steep end groove.

If the record being played is provided with a circular end groove which is eccentrically located one of the above-mentioned operations, or the other, will take place depending upon the nature of the end groove and the positioning of the record on the turntable.

According to a modification of the mechanism just described the wheel 15 may be dispensed with, the circular cam 14 being mounted directly on the wheel 16. This simplified construction may be used in such cases where the load on the wheel 16 due to mechanical devices controlled by the same is small enough to permit the wheel 16 to be rotated by the relatively weak arm 7 without incurring the risk of damaging the latter.

Figure 5:
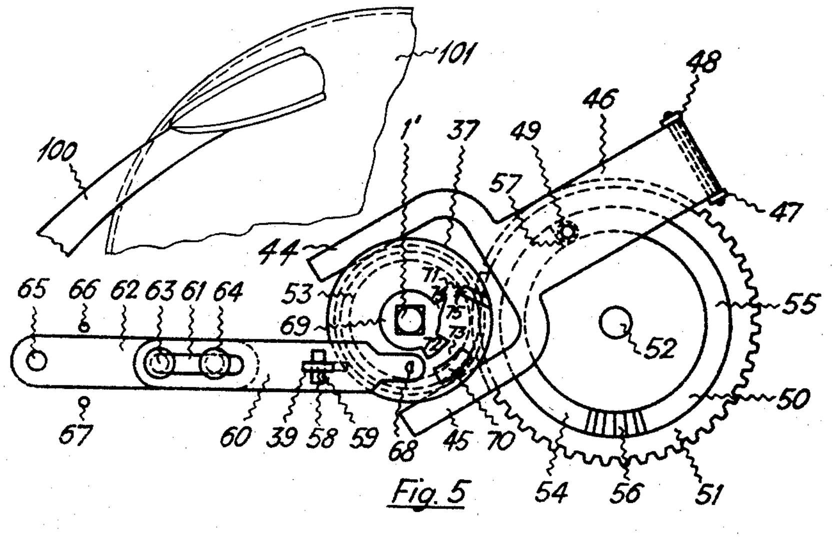
Fig. 5 is a plan view of the mechanism shown in Fig. 4.
Figure 4:
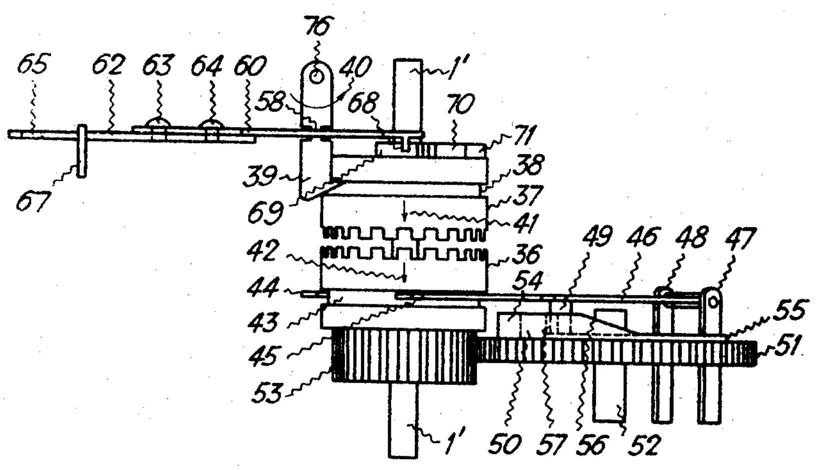
Fig. 4 is a side elevation of the second embodiment of the control mechanism.

In the embodiment of the present invention shown in Figs. 4 and 5 reference numeral 1′ designates a shaft which is continuously rotated clockwise by the motor of the gramophone. On the shaft 1′ there is mounted a clutch consisting of two clutch elements 36 and 37 which are provided with claws and of which the upper element 37 has a square hole and is mounted on a square portion of the shaft (see Fig. 5) so that this clutch element will always rotate together with the shaft 1′ but may be moved in axial direction upon the same. The lower clutch element 36 has a round hole and is mounted on a round portion of the shaft 1′. This clutch element therefore may be rotated on the shaft and is also movable in axial direction upon the same.

The upper clutch element 37 has a circumferential groove 38 in which a pawl 39 engages. This pawl is pivotally mounted on a shaft 76 and is actuated by a spring (not shown) which tends to rotate the pawl in the direction indicated by the arrow 40. The upper clutch element 37 is actuated by a spring (not shown) which tends to urge the same downwardly, as indicated by the arrow 41.

The lower clutch element 36 is also actuated by a spring (not shown) tending to move the same downwardly as indicated by the arrow 42. A circumferential groove 43 is provided in the clutch element 36. This groove is engaged by the two legs 44 and 45 of a fork-like arm 46 which is pivotally mounted in fixed bearing members 47 and 48. The arm 46 carries a downwardly projecting pin 49 which slides upon a circular cam 50 provided on a gear 51 which is pivotally mounted on a shaft 52 and which is permanently in mesh with a toothed rim 53 provided at the lower end of the lower clutch element 36.

The circular cam 50 is provided with an upper cam portion 54 and with a lower cam portion 55. An inclined portion 56 connects the lower cam portion 55 with the upper cam portion 54, the other boundary between these cam portions being in the shape of an abrupt offset or shoulder 57.

The pawl 39 has a narrow portion 58 which extends through a slot 59 in an arm 60. By means of a slot 61 provided in the arm 60 and two rivets 63 and 64 secured to another arm 62 and extending through said slot the arm 60 is slidably connected to the arm 62 which is pivotally mounted on a shaft 65. Two stop pins 66 and 67 serve to limit the turning movement of the arm 62.

The arm 60 carries a depending pin 68 adapted to cooperate with three cams 69, 70 and 71 provided on the upper side of the upper clutch element 37. The central cam 69 has a radial projection 72. Between this projection 72 and the outer cam 70 a channel-shaped space 73 is formed. The cam 69 has also another projection 74. Between this projection 74 and the cam 71 a gate 75 is formed.

The operation of this device is as follows:

When a record is being played the parts occupy the positions shown in the figures. The tone arm is frictionally coupled to the arm 62 so that the latter together with the arm 60 is slowly turned counter-clockwise about the shaft 65. The pin 68 is thus moved inwardly towards the shaft 1′ which rotates continuously clockwise. During each revolution of the upper clutch element 37 the projection 72 of the central cam 69 engages the pin 68 and moves the same outwardly, i. e. it turns the arms 60 and 62 clockwise about the shaft 65. After having been actuated by the projection 72 the pin 68 passes through the gate 75. This gate has for its object to move the pin 68 to a predetermined starting position and is located at a somewhat greater distance from the centre of the shaft 1′ than the left hand end, or mouth, of the channel 73 between the outer cam 70 and the projection 72 on the central cam 69. During the period following after the gate 75 has left the pin 68 and until the projection 72 engages the same the pin 68 is moved inwardly by the tone arm, however, so as to enter the channel 73.

If the record being played is provided with a steep end groove and the reproducing needle enters the same the angular velocity of the tone arm as well as of the arms 62 and 60 is increased. During the period following after the gate 75 has left the pin 68 and until the cams 70 and 72 approach the same the pin 68 therefore is moved inwardly a greater distance than that which corresponds to the difference in distance from the centre of the shaft 1′ to the gate 75 and to the left hand end, or mouth, of the channel 73, respectively. The cam projection 72 therefore will strike the pin 68 whose front side is flat, as shown, and move the arm 60 to the left. This makes the pawl 39 turn about the shaft 76 against the action of the force 40 so that the nose of the pawl leaves the groove 38 in the upper clutch element 37. The upper clutch element 37 being thus released is urged downwardly by the force 41 so that the cams 69, 70 and 71 are retracted from the path of movement of the pin 68 and the clutch elements 37 and 36 are caused to engage whereby the lower clutch element 36 starts to rotate. Since the toothed rim 53 on the clutch element 36 is permanently in mesh with the gear 51 this gear also starts to rotate counter-clockwise. When this rotation has continued for some time the inclined cam portion 56 enters under the pin 49 causing the pin and the arm 46 carrying the same to be raised. Simultaneously the legs 44 and 45 of the arm 46 raise the lower clutch element 36 as well as the upper clutch element 37, now resting thereon, against the action of the forces 41 and 42 until the pawl 39 again engages the groove 38 in the upper clutch element 37 locking this in its upper position. During the continued rotation of the gear 51 the upper cam portion 54 of the circular cam 50 proceeds under the pin 49 of the arm 46 and finally allows the pin 49 to fall down at the abrupt offset 57 onto the lower cam portion 55 under the influence of the force 42. The lower clutch element 36 is thus moved downwardly out of engagement with the upper clutch element 37 so that the rotation of the lower clutch element 36 and the gear 51 ceases. The various parts have now re-assumed the positions shown in the figures.

The gear ratio of the wheels 53 and 51 is such that when the inclined portion 56 of the circular cam 50 enters under the pin 49 thereby raising the cams 69, 70 and 71 to the plane in which the pin 68 is moving the projection 72 on the central cam 69 and the outer cam 70 have passed but the gate 75 has not yet passed the pin 68. Thus the pin 68 is first actuated by the gate 75 and moved by the same to the correct starting position regardless of the position of the arms 60 and 62.

It is assumed that the gear 51 drives the record changing mechanism. The cams necessary for this purpose may suitably be provided directly on the gear 51. The record changing operation should be concluded and the tone arm placed in the correct initial position on the new record before the inclined portion 56 of the circular cam 50 enters under the pin 49.

If the record being played is lacking a steep end groove and instead is provided with a circular concentric end groove the turning movement of the tone arm and of the arms 62 and 60 ceases when the reproducing needle enters this end groove. The pin 68 then remains in the position to which it was last moved by the gate 75. In this position of the pin 68 the same will be struck by the outer cam 70 and moved to the left. This causes the pawl 39 to be withdrawn from the groove 38 and the same operation to be brought about as described in connection with records having a steep end groove.

In case of records having a circular end groove which is eccentrically located one of the above described operations, or the other, will take place depending upon the positioning of the record on the turntable.

It is to be understood that the details of the invention herein disclosed, are subject to alteration within the spirit or scope of the appended claims.

What I claim is:

1. In a control mechanism for record changing phonographs of the type having a tone arm and a turntable, an impulse receiving member mounted so as to be turnable and also moveable in longitudinal direction and adapted to be turned constantly in one direction by the tone arm during the playing of a record, and a rotary cam member cooperating with said impulse receiving member and adapted to be driven continuously from the turntable, said cam member being provided with a first cam located in the path of movement of the impulse receiving member and adapted periodically to return the same to a predetermined position in a direction opposite to that in which it is moved by the tone arm, and a second cam to actuate said impulse receiving member and impart a longitudinal movement thereto if the same remains in the predetermined position imparted to it by the first cam, said first cam being provided with an abutment adapted to actuate the impulse receiving member and to impart a longitudinal movement thereto upon a sudden increase of the angular velocity of the tone arm.

2. In a control mechanism for record changing phonographs of the type having a tone arm and a turntable, an impulse receiving member mounted for turning movement and adapted to be turned constantly in one direction by the tone arm during the playing of a record, and a rotary cam member cooperating with said impulse receiving member, said cam member being provided with a first and central cam towards which the impulse receiving member is to be moved by the tone arm and which periodically returns said member outwardly to a predetermined position, and a second and eccentrically located cam arranged at a smaller distance from the center of the cam member than the distance from the impulse receiving member to said center when the impulse receiving member is in the aforesaid predetermined position, whereby said second cam will actuate said impulse receiving member if the same remains in the said predetermined position as a result of the cessation of the turning movement of the tone arm.

3. A control mechanism according to claim 2, in which the first cam and the second cam are arranged so as to form between them a groove through which the impulse receiving member is adapted to pass repeatedly during the playing of a record, and in which a third cam is provided angularly spaced from said second cam also provided on the cam member and being radially spaced from said first cam to form therewith a gate for exactly positioning the impulse receiving member.

4. In a control mechanism for record changing phonographs of the type having a tone arm and a turntable, an impulse receiving member mounted so as to be turnable and also movable in longitudinal direction and adapted to be turned constantly in one direction by the tone arm during the playing of a record, a cam member cooperating with said impulse receiving member and adapted to be driven continuously from the turntable, said cam member being provided with a first cam located in the path of movement of the impulse receiving member and adapted periodically to return the same to a predetermined position in a direction opposite to that in which it is moved by the tone arm, and a second cam to actuate said impulse receiving member and to impart a longitudinal movement thereto if the same remains in the aforesaid predetermined position imparted to it by the first cam, the first cam being also provided with an abutment adapted to actuate the impulse receiving member and to impart a longitudinal movement thereto upon a sudden increase of the angular velocity of the tone arm, and means controlled by said impulse receiving member comprising a rotary cam disc, a driving means for said cam disc, and a clutch device controlled by said impulse receiving member and adapted to connect the driving means to the cam disc when a longitudinal movement is imparted to said impulse receiving member.

5. A control mechanism according to claim 4, in which the rotary cam disc controlled by the impulse receiving member is provided with a clutch operating cam portion adapted to disconnect the driving means from the cam disc after the latter has completed one revolution.

HELGE NORÉN.

REFERENCES CITED

The following references are of record in the file of this patent:

UNITED STATES PATENTS

| Number | Name | Date |
|---|---|---|
| 2,298,988 | Todd | Oct. 13, 1942 |
| 2,339,981 | Cranmer et al. | Jan. 25, 1944 |
| 2,426,978 | Alexandersson | Sept. 9, 1947 |